US009686109B2

(12) United States Patent
Sai et al.

(10) Patent No.: US 9,686,109 B2
(45) Date of Patent: Jun. 20, 2017

(54) WIRELESS COMMUNICATION DEVICE, INTEGRATED CIRCUITRY, AND WIRELESS COMMUNICATION METHOD

(71) Applicant: Kabushiki Kaisha Toshiba, Minato-ku (JP)

(72) Inventors: Akihide Sai, Kawasaki (JP); Masanori Furuta, Odawara (JP); Tetsuro Itakura, Nerima (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/048,297

(22) Filed: Feb. 19, 2016

(65) Prior Publication Data

US 2016/0173303 A1 Jun. 16, 2016

Related U.S. Application Data

(63) Continuation of application No. PCT/JP2014/072062, filed on Aug. 22, 2014.

(30) Foreign Application Priority Data

Aug. 23, 2013 (JP) ................................. 2013-173844

(51) Int. Cl.
| | |
|---|---|
| H04L 7/033 | (2006.01) |
| H04L 27/22 | (2006.01) |
| H03L 7/08 | (2006.01) |
| H04L 27/16 | (2006.01) |
| H04L 27/227 | (2006.01) |
| H04L 27/32 | (2006.01) |

(52) U.S. Cl.
CPC ............ *H04L 27/16* (2013.01); *H04L 27/227* (2013.01); *H04L 27/32* (2013.01)

(58) Field of Classification Search
CPC ... H04L 27/16; H04L 27/227; H04L 27/2657; H04L 27/32; H04L 7/033; H04L 7/0331; H03L 7/0814
See application file for complete search history.

(56) References Cited

U.S. PATENT DOCUMENTS

| | | | |
|---|---|---|---|
| 5,034,695 | A | 7/1991 | Owen |
| 5,633,898 | A | 5/1997 | Kishigami et al. |
| | | (Continued) | |

FOREIGN PATENT DOCUMENTS

| | | | |
|---|---|---|---|
| JP | 4-103078 A | | 4/1992 |
| JP | 7-183924 A | | 7/1995 |
| | (Continued) | | |

OTHER PUBLICATIONS

International Search Report issued Nov. 18, 2014 in PCT/JP2014/072062 (with English language translation).

(Continued)

*Primary Examiner* — David B. Lugo
(74) *Attorney, Agent, or Firm* — Oblon, McClelland, Maier & Neustadt, L.L.P.

(57) ABSTRACT

A wireless communication device has an analog control loop circuitry that generates an analog control signal to adjust a phase of a voltage controlled oscillation signal, in accordance with a phase of a reception signal, a digital control loop circuitry that generates a digital control signal having a frequency determined by a frequency of a reference signal and a predetermined frequency setting code signal and having a phase opposite to a phase of the analog control signal, a voltage controlled oscillator that generates the voltage controlled oscillation signal, on the basis of the analog control signal and the digital control signal, and a data slicer that generates a digital signal obtained by digital demodulation of the reception signal, on the basis of a comparison result of the digital control signal and a predetermined threshold value.

15 Claims, 17 Drawing Sheets

(56) References Cited

U.S. PATENT DOCUMENTS

| | | | |
|---|---|---|---|
| 6,429,693 B1 | 8/2002 | Staszewski et al. | |
| 7,180,377 B1* | 2/2007 | Leong | H03L 7/087 |
| | | | 327/157 |
| 2006/0214737 A1* | 9/2006 | Brown | H03L 7/0893 |
| | | | 331/16 |
| 2009/0086856 A1 | 4/2009 | Seki et al. | |
| 2009/0207961 A1* | 8/2009 | Sai | H03L 7/087 |
| | | | 375/375 |
| 2012/0161832 A1* | 6/2012 | Lee | H03L 7/0802 |
| | | | 327/156 |

FOREIGN PATENT DOCUMENTS

| | | |
|---|---|---|
| JP | 7-297868 A | 11/1995 |
| JP | 2548336 B2 | 10/1996 |
| JP | 2002-76886 A | 3/2002 |
| JP | 2009-81813 A | 4/2009 |
| JP | 2010-251821 A | 11/2010 |
| JP | 2015-520555 A | 7/2015 |

OTHER PUBLICATIONS

Robert Bogdan Staszewski, et al., "All-Digital PLL and Transmitter for Mobile Phones" IEEE Journal of Solid-State Circuits, vol. 40, No. 12, Dec. 2005, pp. 2469-2482.

* cited by examiner

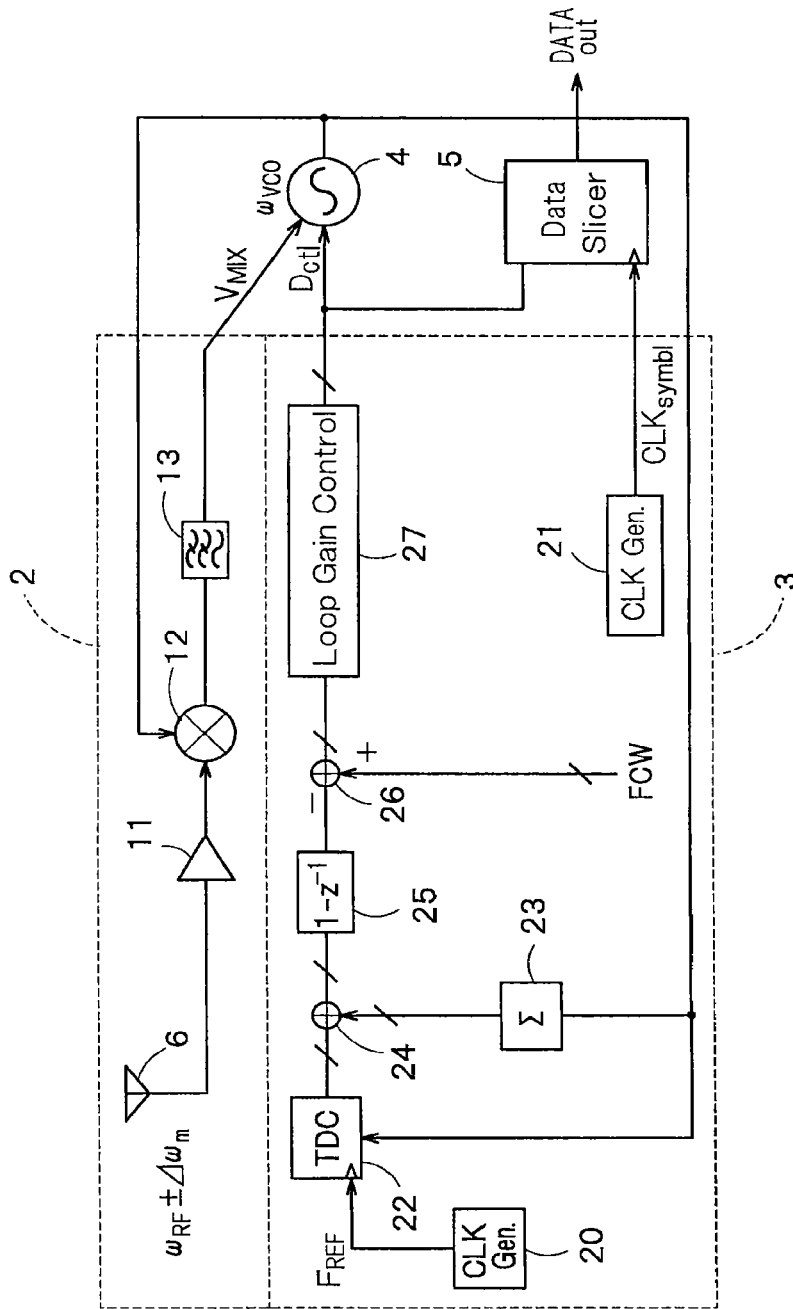
F I G. 1

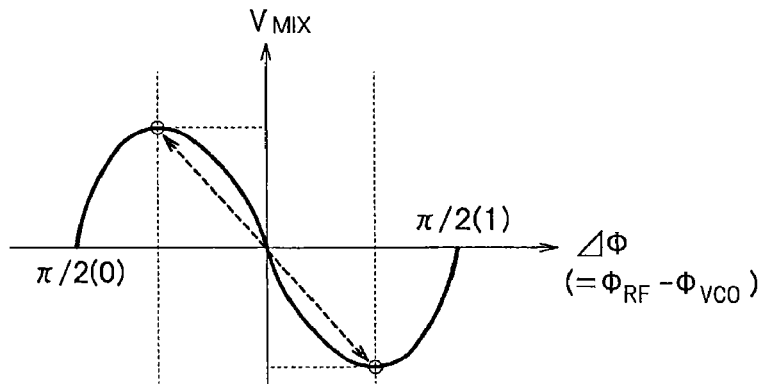
F I G. 2A
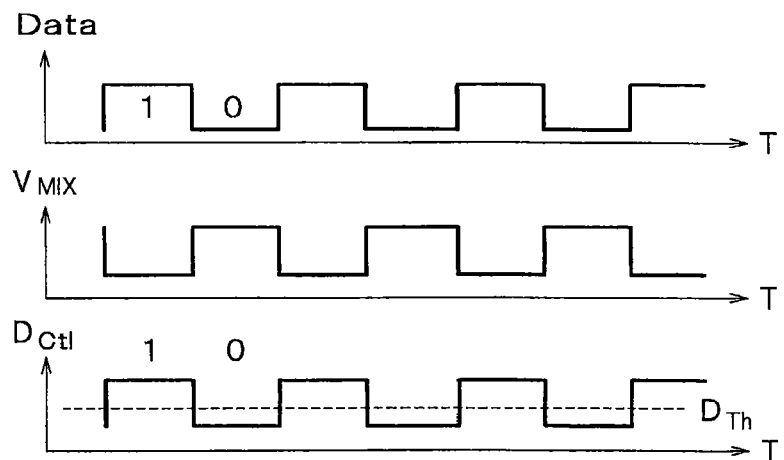
F I G. 2B
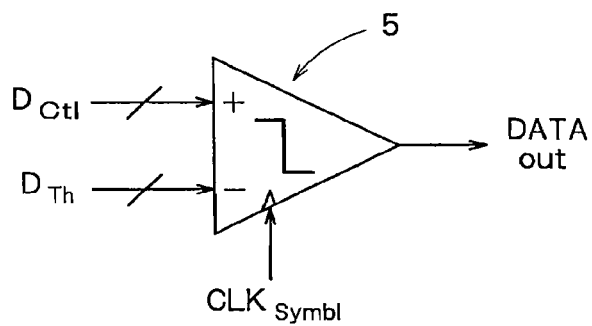
F I G. 3

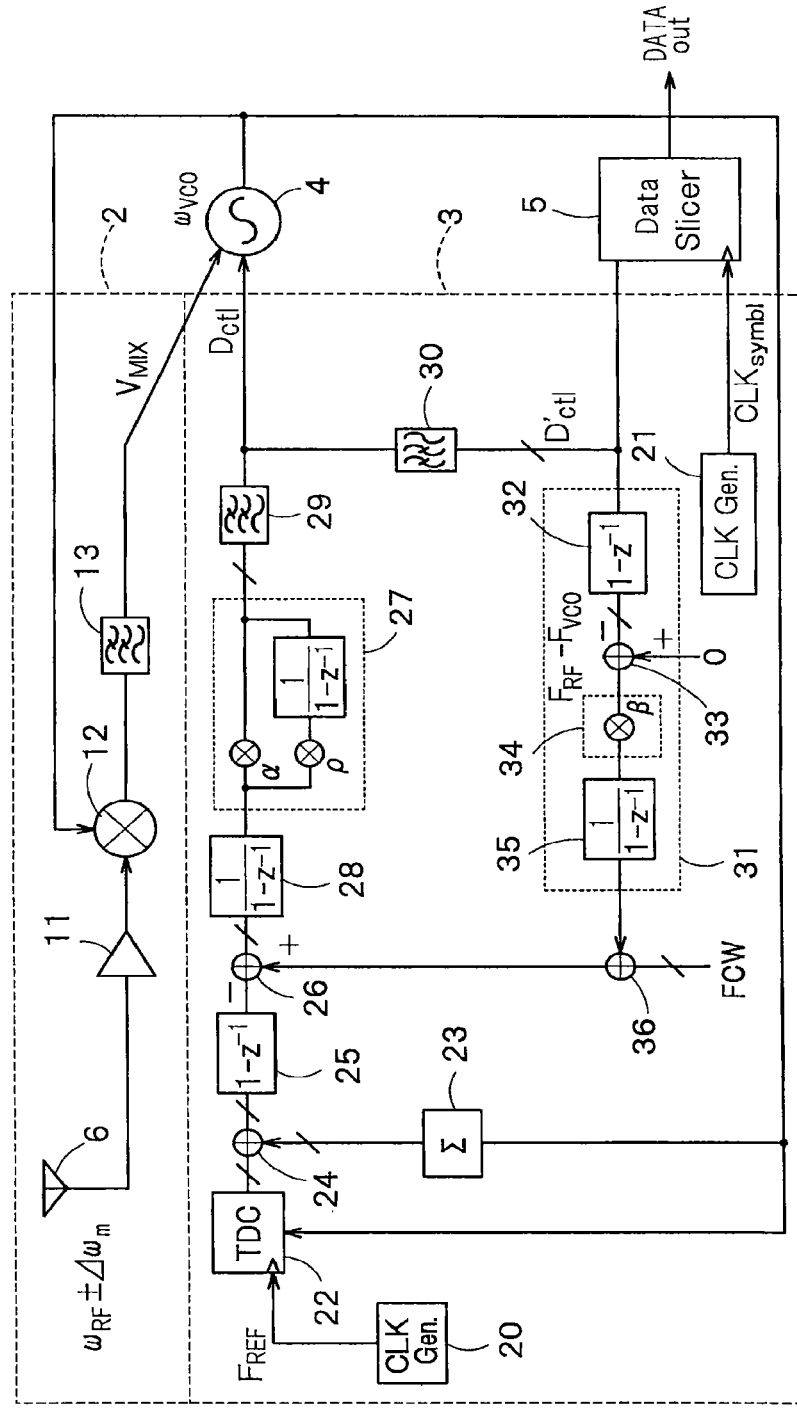
F I G. 8

F I G. 9A
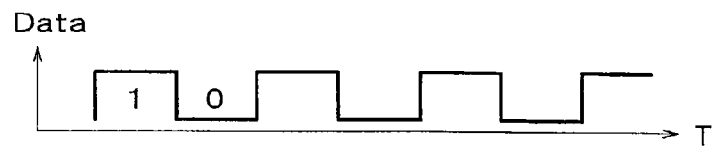
F I G. 9B
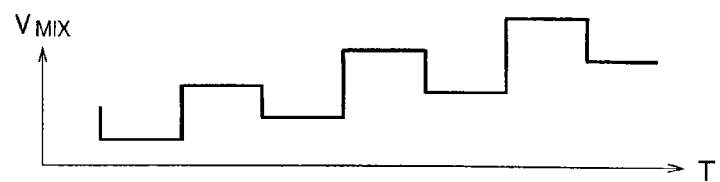
F I G. 9C
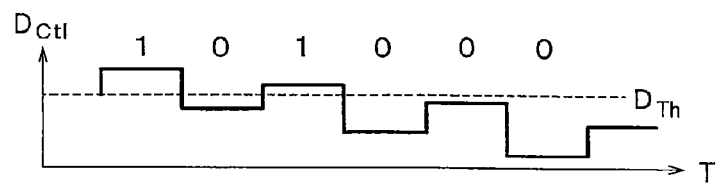
F I G. 10A
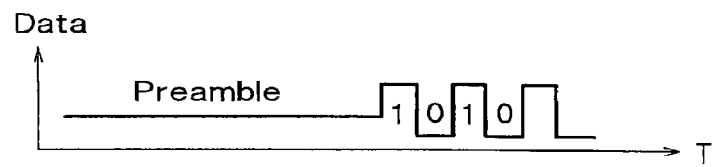
F I G. 10B
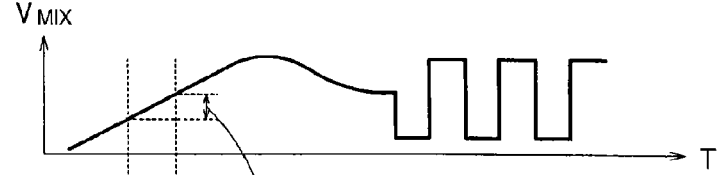
F I G. 10C
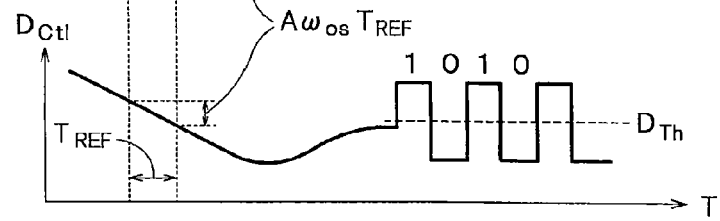

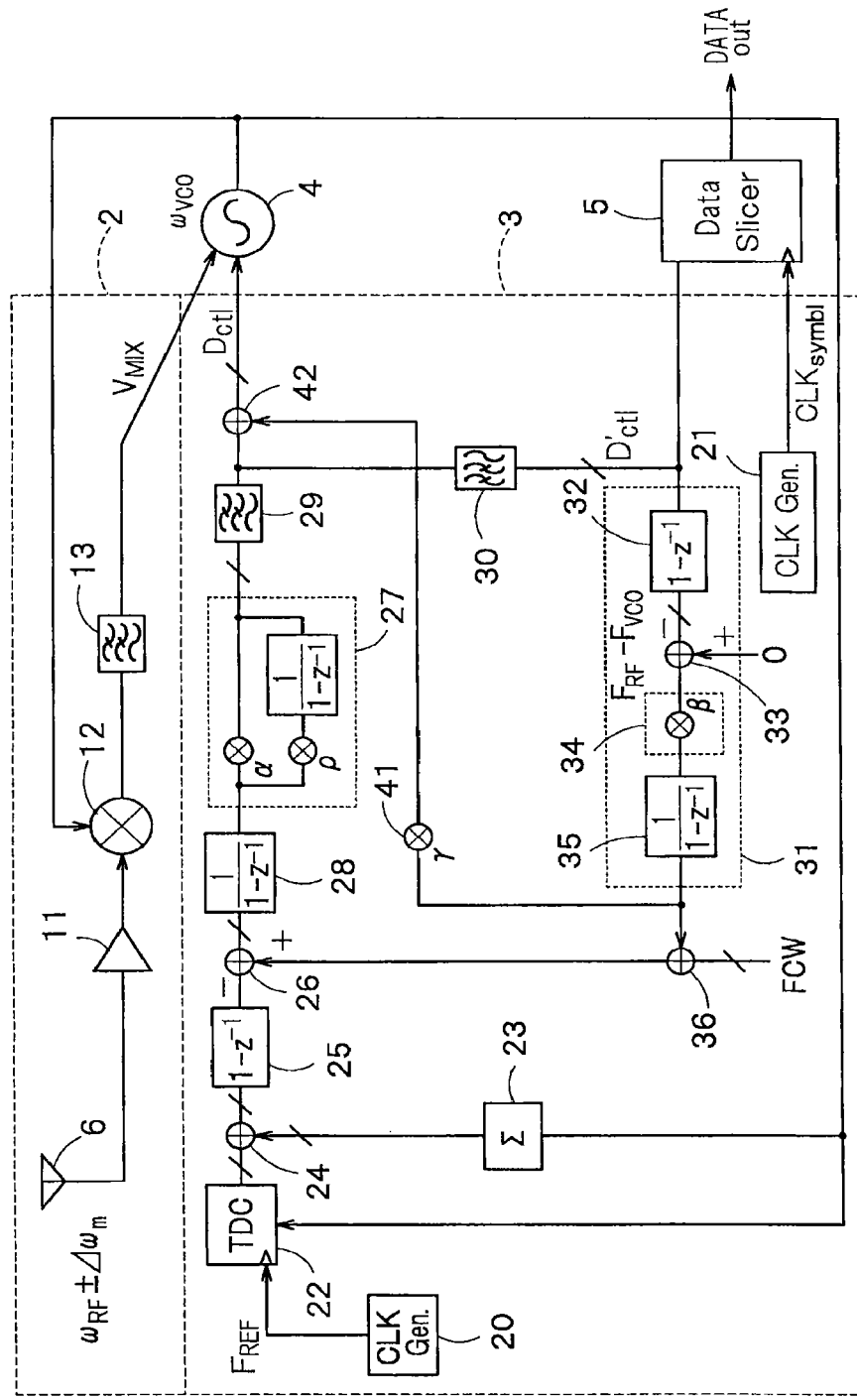
F I G. 12

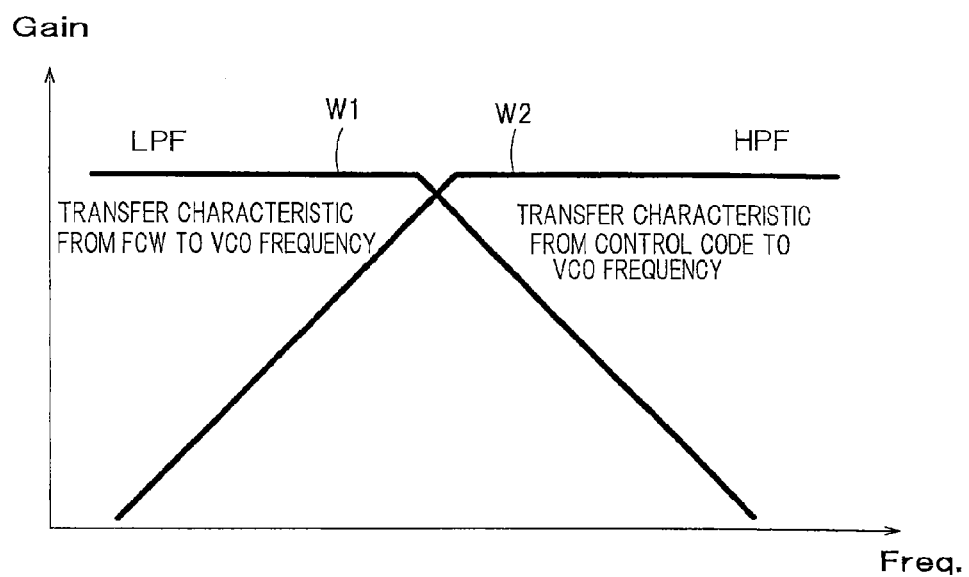
F I G. 13

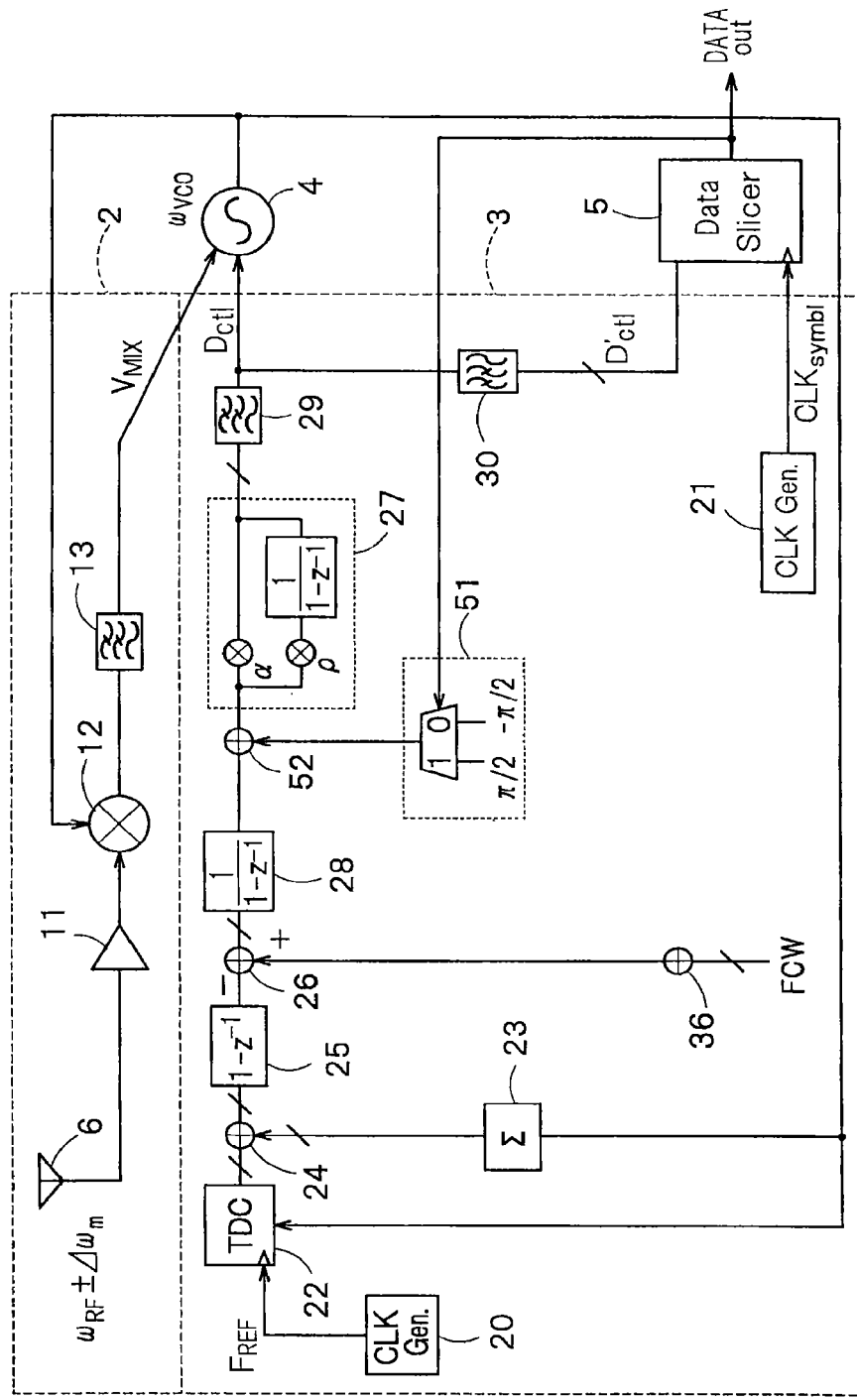
F I G. 14

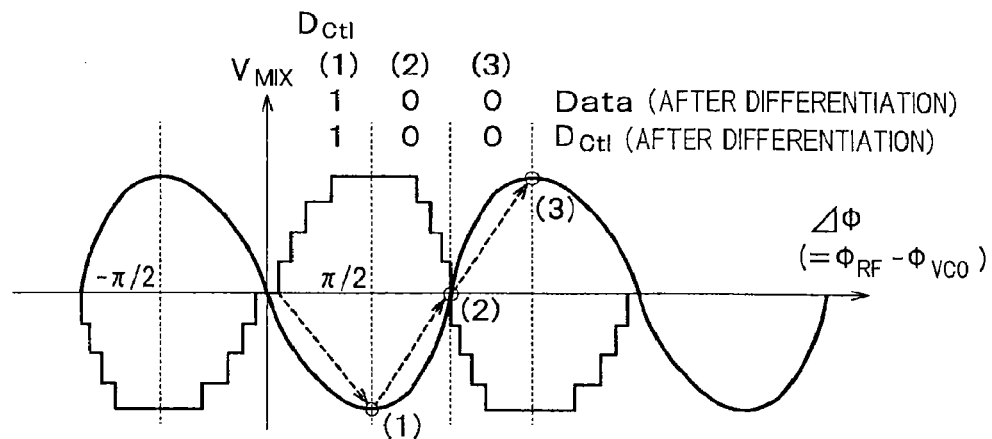
F I G. 15A
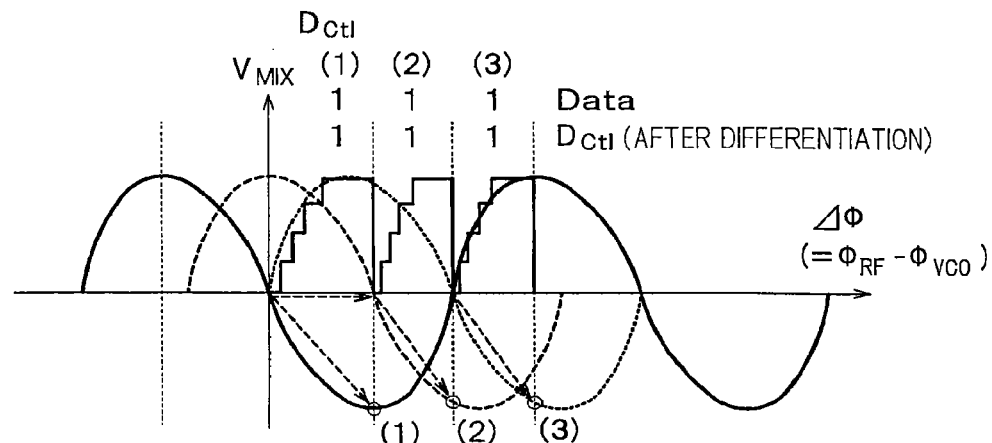
F I G. 15B

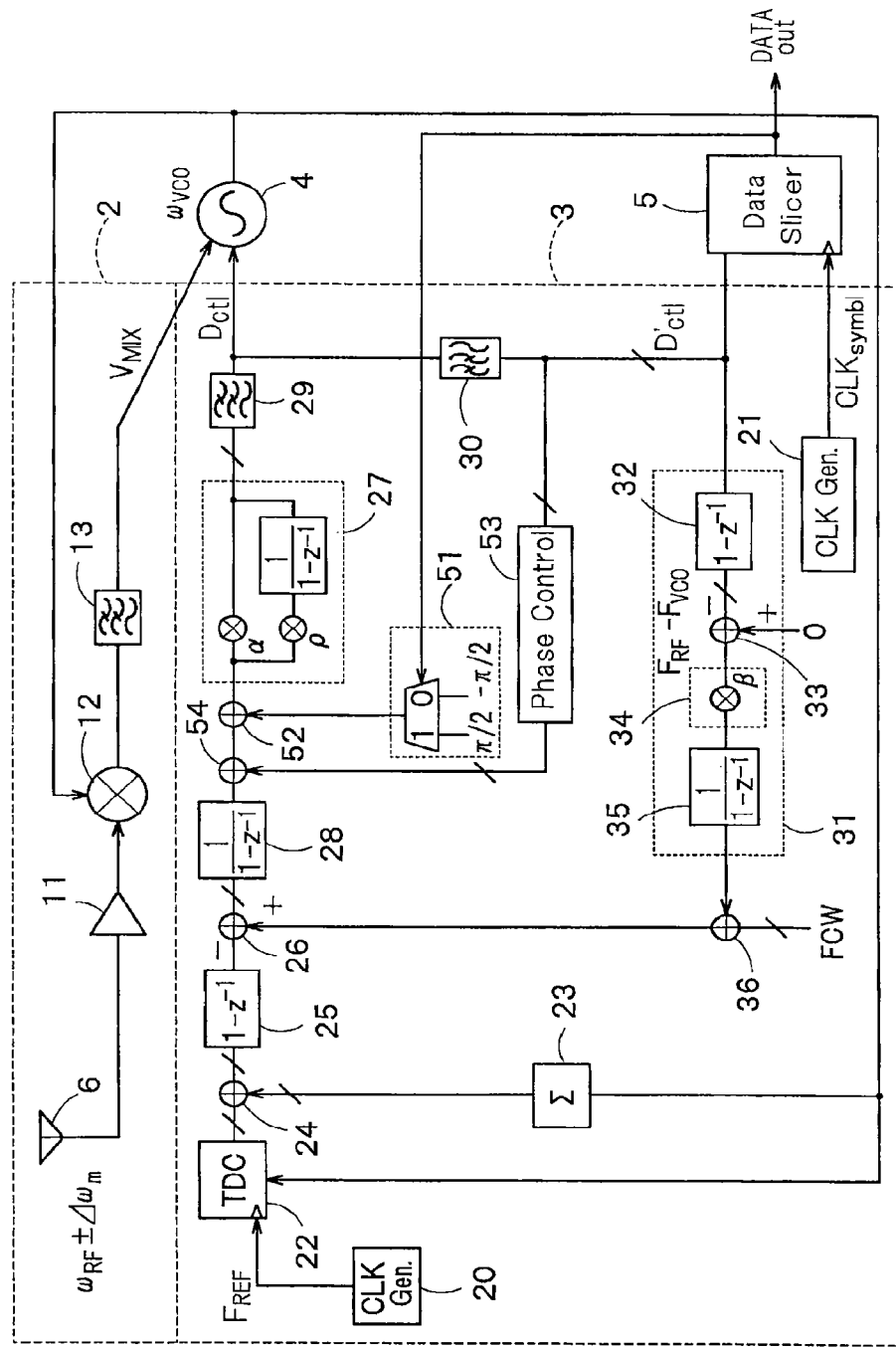
F I G. 16

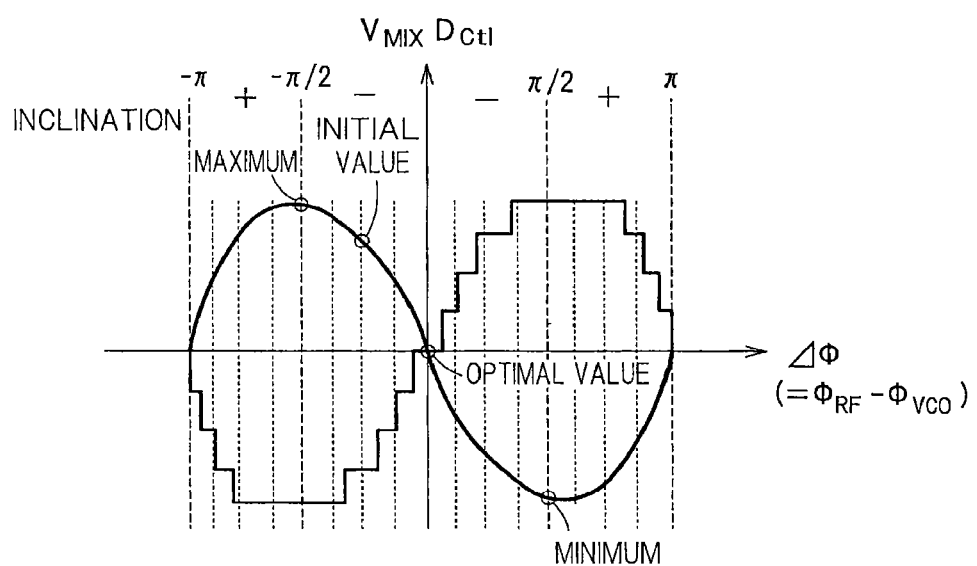
F I G. 17

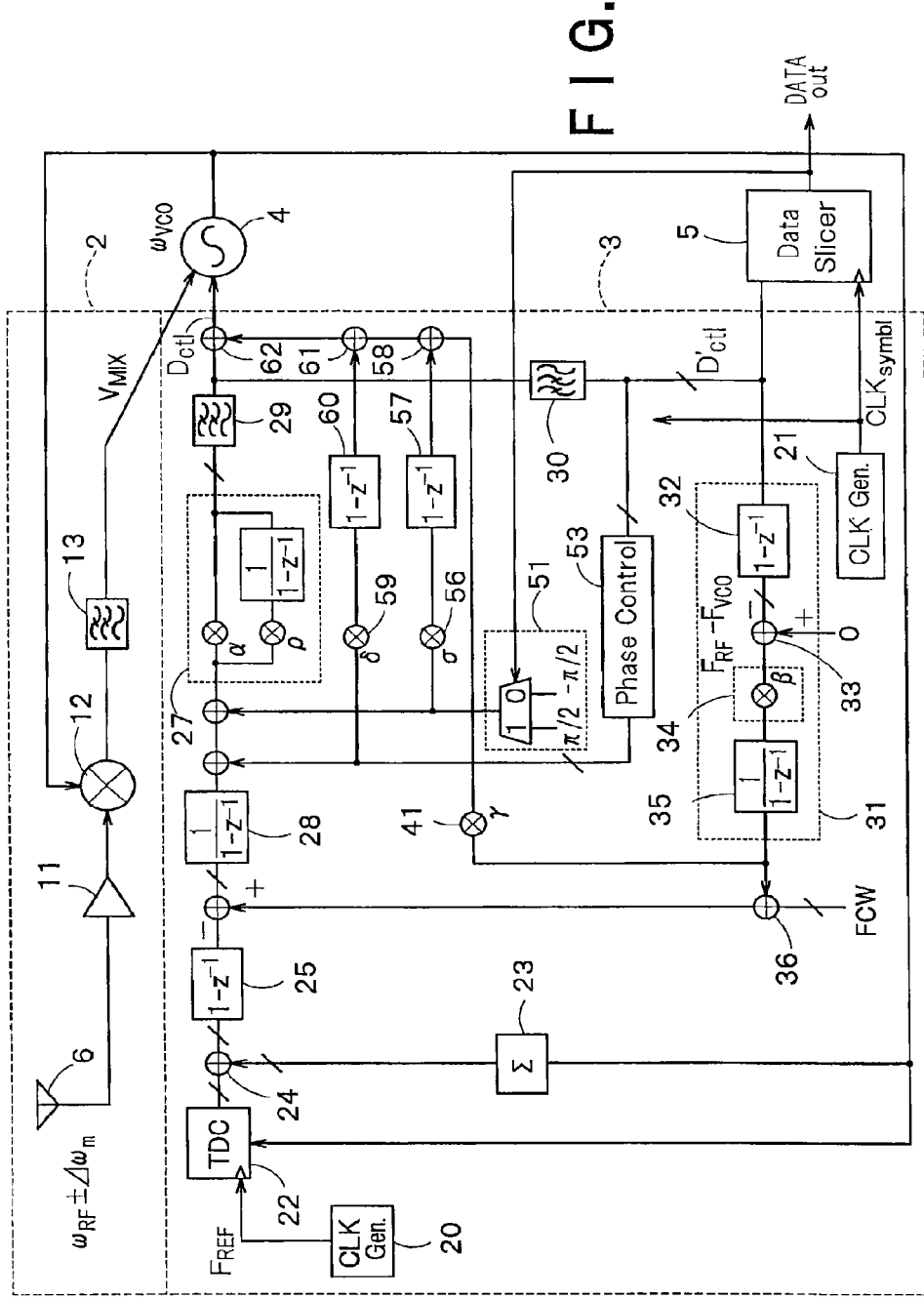
F I G. 18

WIRELESS COMMUNICATION DEVICE, INTEGRATED CIRCUITRY, AND WIRELESS COMMUNICATION METHOD

CROSS REFERENCE TO RELATED APPLICATIONS

This application is based upon and claims the benefit of priority from the prior Japanese application No. 2013-173844 filed on Aug. 23, 2013 and the PCT application No. PCT/JP2014/072062, filed on Aug. 22, 2014, the entire contents of which are incorporated herein by reference.

FIELD

The present invention relates to a wireless communication device, an integrated circuitry, and a wireless communication method.

BACKGROUND

An analog synchronous PSK/FSK demodulator according to the related art includes a mixer to execute frequency conversion on an RF signal received by an antenna, a channel selection filter, and a voltage controlled oscillator (VCO) to supply a local oscillation signal to the mixer and adopts a phase locked loop to supply a control voltage of the VCO from an output of the channel selection filter and lock phases of a VCO frequency and an RF signal frequency.

In this type of demodulator, when there is an interfering wave having large power, the VCO is pulled in an interfering wave frequency, instead of the RF signal frequency. Therefore, interfering wave resistance is not sufficient. For example, even though it is considered that the interfering wave is suppressed by a BPF disposed at a previous stage of the mixer, when the interfering wave frequency approaches an RF signal, an extraordinarily sharp cutoff characteristic that cannot be realized in an external component is required. Therefore, a problem is not resolved.

BRIEF DESCRIPTION OF THE DRAWINGS

FIG. 1 is a block diagram illustrating a schematic configuration of a receiver 1 according to a first embodiment;

FIGS. 2A and 2B are diagrams illustrating a demodulation principle of a BPSK signal;

FIG. 3 is a diagram illustrating an example of an internal configuration of a data slicer;

FIG. 8 is a block diagram illustrating a schematic configuration of a receiver 1 according to a third embodiment;

FIGS. 9A to 9C are timing diagrams when there is a frequency offset between a reception signal and a VCO signal;

FIG. 10A is a diagram illustrating data of a reception signal in a preamble portion of the reception signal, FIG. 10B is a diagram illustrating an analog control signal $V_{MIX}$ in the preamble portion, and FIG. 10C is a diagram illustrating a waveform of a digital control signal $D_{ctl}$ in the preamble portion;

FIG. 12 is a block diagram illustrating a schematic configuration of a receiver 1 according to a fourth embodiment;

FIG. 13 is a diagram illustrating a transfer characteristic of FIG. 12;

FIG. 14 is a block diagram illustrating a schematic configuration of a receiver 1 according to a fifth embodiment;

FIGS. 15A and 15B are waveform diagrams illustrating an operation principle of a phase shift unit 51;

FIG. 16 is a block diagram illustrating a schematic configuration of a receiver 1 according to a sixth embodiment;

FIG. 17 is a signal waveform diagram illustrating an operation according to the sixth embodiment;

FIG. 18 is a block diagram illustrating a schematic configuration of a receiver 1 according to a seventh embodiment;

DETAILED DESCRIPTION

Figure 4:
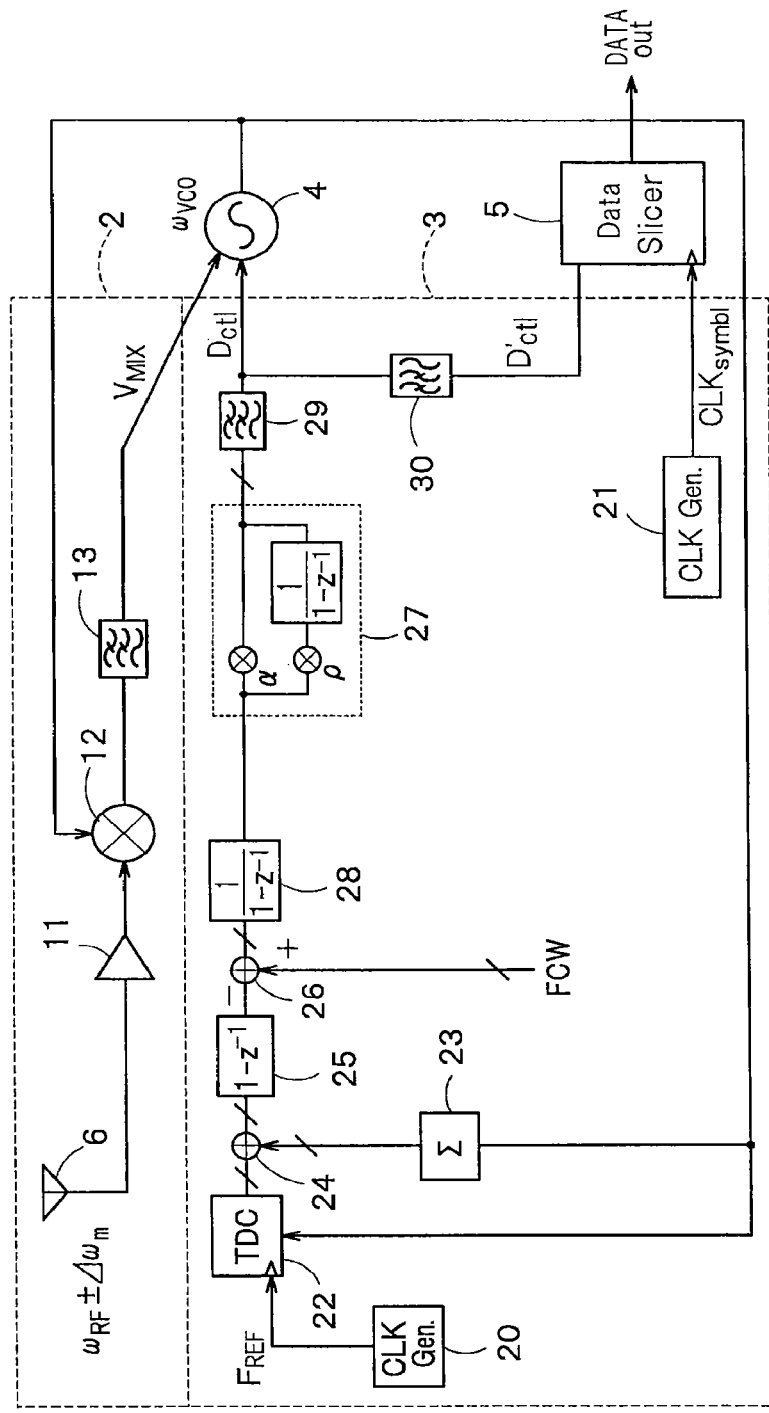
FIG. 4 is a block diagram illustrating a schematic configuration of a receiver 1 according to a second embodiment.

A wireless communication device according to one embodiment has an analog control loop circuitry that generates an analog control signal to adjust a phase of a voltage controlled oscillation signal, in accordance with a phase of a reception signal, a digital control loop circuitry that generates a digital control signal having a frequency determined by a frequency of a reference signal and a predetermined frequency setting code signal and having a phase opposite to a phase of the analog control signal, a voltage controlled oscillator that generates the voltage controlled oscillation signal, on the basis of the analog control signal and the digital control signal, and a data slicer that generates a digital signal obtained by digital demodulation of the reception signal, on the basis of a comparison result of the digital control signal and a predetermined threshold value. Gain of the digital control loop circuitry is higher than gain of the analog control loop circuitry.

Hereinafter, embodiments of the present invention will be described with reference to the drawings.

First Embodiment

FIG. 1 is a block diagram illustrating a schematic configuration of a receiver 1 in a wireless communication device according to a first embodiment. The receiver 1 of FIG. 1 includes an analog control loop unit (analog control loop circuitry) 2, a digital control loop unit (digital control loop circuitry) 3, a voltage controlled oscillator 4, and a data slicer 5. The receiver 1 of FIG. 1 is used when a PSK signal is received, for example. The wireless communication device according to the following embodiment may include only the receiver and may include a configuration other than the receiver, such as a transmitter. In addition, the wireless communication device may be a stationary communication device and may be a portable wireless terminal.

The analog control loop unit 2 generates an analog control signal $V_{MIX}$ to adjust a phase of a voltage controlled oscillation signal, in accordance with a phase of a reception signal received by an antenna 6.

The digital control loop unit 3 generates a digital control signal $D_{ctl}$ that has a frequency determined by a frequency of a reference signal and a predetermined frequency setting code signal, offsets fluctuation of the phase of the voltage controlled oscillation signal, and has a phase opposite to a phase of the analog control signal $V_{MIX}$.

The analog control loop unit 2 performs a tracking control so that a frequency of the voltage controlled oscillation signal follows the reception signal. Meanwhile, the digital control loop unit 3 prevents the tracking control and instead performs a tracking control so that the frequency of the voltage controlled oscillation signal matches a setting frequency determined by the reference signal and the frequency setting code signal. As a result of performing the opposite tracking controls, the analog control signal $V_{MIX}$ generated by the analog control loop unit 2 and the digital control signal $D_{ctl}$ generated by the digital control loop unit 3 become differential signals of which phases are opposite to each other.

The voltage controlled oscillator 4 (VCO) generates a voltage controlled oscillation signal (hereinafter, referred to as the VCO signal), on the basis of the analog control signal $V_{MIX}$ and the digital control signal $D_{ctl}$.

The data slicer 5 compares the digital control signal $D_{ctl}$ with a predetermined threshold value in synchronization with a reference signal $CLK_{symbol}$ from a second reference signal source 21 and generates a digital signal in accordance with the reception signal. The digital signal is a signal obtained by digital demodulation of the reception signal and a digital demodulator does not need to be provided separately.

The analog control loop unit 2 has a low noise amplifier 11, a frequency converter 12, and a low-pass filter 13. The low noise amplifier 11 amplifies the reception signal received by the antenna 6. The frequency converter 12 generates a phase difference signal of the reception signal and the VCO signal. The low-pass filter 13 removes an unnecessary high frequency component included in an output signal of the frequency converter 12 and generates the analog control signal $V_{MIX}$.

The digital control loop unit 3 has a first reference signal source 20, the second reference signal source 21, a phase-digital converter (TDC: time-to-digital converter) 22, a binary counter 23, a digital adder 24, a digital differentiator 25, a digital subtracter 26, and a loop gain control unit (loop gain controller) 27.

The phase-digital converter 22 detects a phase of the VCO signal in synchronization with a reference signal $F_{REF}$ from the first reference signal source 20. The binary counter 23 executes a count operation in synchronization with a rising edge of the VCO signal.

The digital adder 24 adds an output signal of the phase-digital converter 22 and a count signal of the binary counter 23 and detects the phase of the VCO signal. Because the binary counter 23 measures the phase of the VCO signal roughly and the phase-digital converter 22 measures the phase of the VCO signal finely, the phase of the VCO signal can be detected by adding output signals of the phase-digital converter 22 and the binary counter 23 by the digital adder 24.

The digital differentiator 25 performs differentiation processing on an output signal of the digital adder 24 and converts a signal expressing the phase of the VCO signal into a frequency signal.

The digital subtracter 26 detects a difference of an output signal of the digital differentiator 25 and the frequency setting code signal FCW and generates a frequency error signal. The loop gain control unit 27 generates the digital control signal $D_{ctl}$, on the basis of an output signal of the digital subtracter 26.

The digital control loop unit 3 is composed of an all-digital (AD) PLL. The description of an operation principle of the ADPLL is omitted. If a frequency of the reference signal is set as $F_{ref}$, a setting frequency $F_{VCO}$ in the digital control loop unit 3 is represented by the following formula (1).

$$F_{VCO}=FCW \times F_{ref} \qquad (1)$$

In the receiver 1 of FIG. 1, channel selection is performed by matching the setting frequency $F_{VCO}$ represented by the formula (1) with a carrier frequency of the reception signal. However, if the reception signal is BPSK-modulated, a phase thereof is shifted by ±π/2. Therefore, inconsistency occurs between control operations of the analog control loop unit 2 that tries to track the shifted phase and the digital control loop unit 3 that tries to maintain the phase within the constant range. Therefore, the receiver 1 of FIG. 1 sets loop gain of the digital control loop unit 3 to be sufficiently higher than loop gain of the analog control loop unit 2. As a result, the receiver 1 of FIG. 1 demodulates and converts digitally a PSK modulation signal, thereby improving resistance to an interfering wave superimposed on a modulation signal.

FIGS. 2A and 2B are diagrams illustrating a demodulation principle of a BPSK signal. If the BPSK-modulated reception signal (BPSK signal) and the VCO signal are input to the frequency converter 12, an output signal of the frequency converter 12 has two phases shown by circles of FIG. 2A. That is, as illustrated in a timing diagram of FIG. 2B, because a phase of the VCO signal is delayed by π/2 as compared with a phase of the reception signal, the analog control loop unit 2 drives the analog control signal $V_{MIX}$ with a plus side and if the phase advances by π/2, the analog control loop unit 2 drives the analog control signal $V_{MIX}$ with a minus side and controls the phase to track the phase of the reception signal Data.

Meanwhile, the digital control loop unit 3 performs an operation for hindering an operation of the analog control loop unit 2. Because the gain of the digital control loop unit 3 is higher than the gain of the analog control loop unit 2, a phase of the digital control signal $D_{ctl}$ becomes a phase opposite to the phase of the analog control signal $V_{MIX}$, as illustrated in FIG. 2B. As a result, the analog control signal $V_{MIX}$ and the digital control signal $D_{ctl}$ become differential signals of which phases are opposite to each other. If the phase when the digital control signal $D_{ctl}$ is operated with the plus side is determined as 1(+π/2) and the phase when the digital control signal $D_{ctl}$ is operated with the minus side is determined as 0(−π/2), the BPSK signal can be demodulated.

The digital control signal $D_{ctl}$ generated by the loop gain control unit 27 of FIG. 1 has a value converted digitally and if the data slicer 5 is provided, binary data of 0 and 1 can be generated easily. As illustrated in FIG. 3, the data slicer 5 is a digital comparator operated with a reference clock synchronized with a symbol rate of the reception signal and determination of 1(+π/2) and 0(−π/2) can be performed accurately by setting a threshold value to an appropriate level.

As such, in the receiver 1 of FIG. 1, an A/D converter that needs to be provided originally at a rear step side of the frequency converter 12 is unnecessary because digital conversion is performed by the phase-digital converter 22 in the digital control loop unit 3 and an internal configuration can be simplified.

In addition, according to a maximum characteristic of the receiver 1 of FIG. 1, resistance to the interfering wave is remarkably high as compared with an analog synchronous FSK/PSK receiver 1 according to the related art. If the loop gain of the digital control loop unit 3 is set to be higher than the loop gain of the analog control loop unit 2, the voltage controlled oscillator 4 can be prevented from being pulled in an interfering wave frequency, even though an interfering wave having large power exists.

Because the loop gain of the digital control loop unit 3 is high at a low frequency (carrier frequency) side and is low at a high frequency (interfering wave frequency) side, an unnecessary component by the interfering wave can be suppressed by a gain difference.

In addition, in the receiver 1 of FIG. 1, it is possible to generate a data signal digitally demodulated by the data slicer 5. Because the digital demodulator does not need to be provided individually, an internal configuration of the receiver 1 can be simplified.

Second Embodiment

In a second embodiment described below, a filter to suppress an interfering wave is provided in a digital control loop unit (digital control loop circuitry) 3.

FIG. 4 is a block diagram illustrating a schematic configuration of a receiver 1 in a wireless communication device according to the second embodiment of the present invention. In FIG. 4, components common to the components of FIG. 1 are denoted with the same reference numerals and a difference is mainly described below.

The receiver 1 of FIG. 4 includes the digital control loop unit 3 that is partially different from the digital control loop unit of FIG. 1. An internal configuration of an analog control loop unit (analog control loop circuitry) 2 of FIG. 4 is the same as the analog control loop unit 2 of FIG. 1.

The digital control loop unit 3 of FIG. 4 includes an integrator 28, a loop filter 29, and a channel selection filter 30 in addition to the configuration of the digital control loop unit 3 of FIG. 1. The integrator 28 converts a frequency error signal generated by a digital subtracter 26 into a phase error signal. The phase error signal is input to a loop gain control unit (loop gain controller) 27.

The loop gain control unit 27 is configured by connecting a proportional path of gain α and an integral path of gain β. Thereby, the digital control loop unit 3 is operated as an ADPLL of a type II with two origin poles and one zero point. Loop gain of the ADPLL of the type II is attenuated at a secondary inclination (40 dB/dec) at a high frequency side.

The loop filter 29 removes a frequency component higher than a frequency component of a reception signal, performs smoothing, and generates a digital control signal $D_{ctl}$.

The channel selection filter 30 is connected to a rear step of the loop filter 29 and suppresses an interfering wave component included in the digital control signal $D_{ctl}$. The suppressed interfering wave component is mainly an interfering wave component in the vicinity of a channel selection frequency.

If frequencies and amplitudes of a reception signal, a VCO signal, and an interfering wave signal at an input terminal of a frequency converter 12 are set as $\omega_{RF}$, $\omega_{VCO}$, $\omega_{Blk}$, $A_{RF}$, $A_{VCO}$, and $A_{Blk}$, respectively, an output $V_{MIX}$ thereof is represented by the following (2), by multiplication processing of the frequency converter 12. A duplicate wave component generated by multiplication is ignored in consideration of the following filter processing.

$$V_{MIX} = \{A_{RF}\cos(\omega_{RF}t + \varphi_m) + A_{Blk}\cos(\omega_{Blk}t)\} \times A_{VCO}\cos(\omega_{VCO}t) \quad (2)$$
$$= (A_{RF}A_{VCO}/2)\cos(\omega_{RF}t - \omega_{VCO}t + \varphi_m) +$$
$$(A_{Blk}A_{VCO}/2)\cos(\omega_{Blk}t - \omega_{VCO}t)$$
$$= (A_{RF}A_{VCO}/2)\cos(\varphi_m) + (A_{Blk}A_{VCO}/2)\cos\{(\omega_{Blk} - \omega_{VCO})t\}$$

Therefore, in the case of BPSK modulation, because $\varphi_m = \pm/\pi$ is satisfied, a first term of a right side of the formula (2) becomes a signal component that takes a value of $\pm(A_{RF}A_{VCO}/2)$ and is to be demodulated. A second term of the right side becomes an unnecessary component by an interfering wave. The unnecessary component appears in a difference frequency of the VCO signal and the interfering wave. For example, when a frequency of the VCO signal is 2.4 GHz and a frequency of the interfering wave is 2.403 GHz, the unnecessary component of the second term of the second formula (2) appears at 3 MHz.

Figure 5A:
FIG. 5A is a diagram illustrating data included in a reception signal.
Figure 5B:
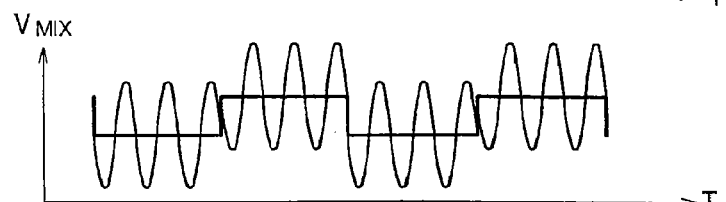
FIG. 5B is a diagram illustrating an analog control signal $V_{MIX}$ of an analog control loop.
Figure 5C:
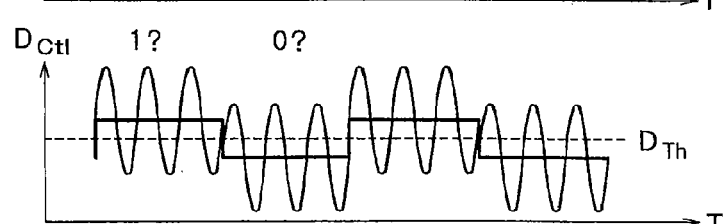
FIG. 5C is a diagram illustrating a digital control signal $D_{ctl}$ of a digital control loop.
Figure 5D:
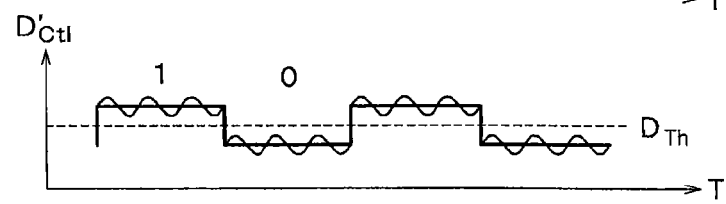
FIG. 5D is a diagram illustrating a waveform of an output signal $D'_{ctl}$ of a channel selection filter 30.

In the wireless communication, power of the interfering wave is larger than power of a desired reception signal and if the reception signal is demodulated as it is, an error rate may be greatly deteriorated. FIGS. 5A to FIG. 5D are timing diagrams illustrating an example of the corresponding case. FIG. 5A is a diagram illustrating data included in a reception signal, FIG. 5B is a diagram illustrating an analog control signal $V_{MIX}$ of an analog control loop, FIG. 5C is a diagram illustrating a digital control signal $D_{ctl}$ of a digital control loop, and FIG. 5D is a diagram illustrating a waveform of an output signal $D'_{ctl}$ of the channel selection filter 30.

The unnecessary component is superimposed on both the analog control signal $V_{MIX}$ of FIG. 5B and the digital control signal $D_{ctl}$ of FIG. 5C. If the digital control signal $D_{ctl}$ is input to the data slicer 5, 1 and 0 cannot be determined accurately. Meanwhile, in the output signal $D'_{ctl}$ of the channel selection filter 30, as illustrated in FIG. 5D, the interfering wave is suppressed. If the output signal $D'_{ctl}$ is input to the data slicer 5, 1 and 0 can be determined accurately by the data slicer 5.

Because an input signal of each of the loop filter 29 and the channel selection filter 30 according to this embodiment is a digital signal, each of the loop filter 29 and the channel selection filter 30 can be configured using a complete digital circuit. More specifically, each of the loop filter 29 and the channel selection filter 30 can be configured using an IIR filter or an FIR filter.

Figure 6:
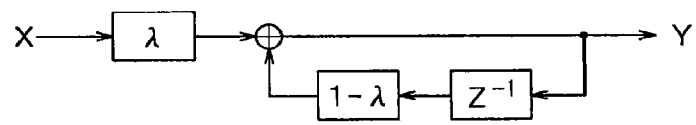
FIG. 6 is a block diagram illustrating an example of an IIR filter.
Figure 7:
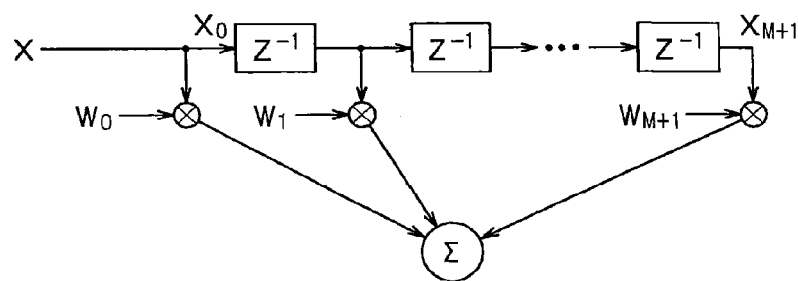
FIG. 7 is a block diagram illustrating an example of an FIR filter.

FIG. 6 is a block diagram illustrating an example of the IIR filter and FIG. 7 is a block diagram illustrating an example of the FIR FILTER. These block diagrams are exemplary and various changes can be made.

In the channel selection filter 30, the IIR filter and the FIR filter are preferably combined appropriately according to a specification of a required group delay characteristic. However, the loop filter 29 is included in the digital control loop composed of ADPLL. Therefore, if stability of the loop is considered, the channel selection filter 30 is preferably composed of the IIR filter having a small delay amount.

As such, in the second embodiment, because the loop filter 29 and the channel selection filter 30 are provided at the rear step of the loop gain control unit 27, the unnecessary component superimposed on the digital control signal $D_{ctl}$ generated by the digital control loop unit 3 can be removed and an error rate at the time of reception can be reduced.

In addition, in this embodiment, because the channel selection filter 30 of the digital type is provided, an area and consumption power of the receiver 1 can be reduced as compared with the channel selection filter 30 of the analog type is provided. Because the loop filter 29 and the channel selection filter 30 can be configured using the IIR filter and the FIR filter illustrated in FIGS. 6 and 7, a configuration can be simplified and the receiver 1 can be easily designed.

Third Embodiment

In a third embodiment described below, a function of cancelling a frequency offset of a reception signal and a VCO signal is provided.

FIG. 8 is a block diagram illustrating a schematic configuration of a receiver 1 in a wireless communication device according to the third embodiment of the present invention. In FIG. 8, components common to the components of FIGS. 1 and 4 are denoted with the same reference numerals and a difference is mainly described below.

The receiver 1 of FIG. 8 includes a digital control loop unit (digital control loop circuitry) 3 having a configuration that is partially different from the configurations of the digital control loop units of FIGS. 1 and 4. An internal configuration of an analog control loop unit (analog control loop circuitry) 2 of FIG. 8 is the same as the analog control loop unit 2 of FIG. 1.

The digital control loop unit 3 of FIG. 8 includes a frequency offset cancellation unit (frequency offset cancellation circuitry) 31 in addition to the configuration of the digital control loop unit 3 of FIG. 4. The frequency offset cancellation unit 31 performs processing for cancelling a deviation (offset) of a frequency of the reception signal and a frequency of the VCO signal.

As illustrated in FIG. 8, the frequency offset cancellation unit 31 has a differentiator 32 to perform differentiation processing of an output signal of a channel selection filter 30, an adder 33, a gain control unit (gain controller) 34, and an integrator 35.

In normal wireless communication, because reference signal sources of a transmitter and the receiver 1 are different from each other, frequencies of the individual reference signal sources are deviated by a minute amount of several to several ten ppm. If there is a frequency offset between the reception signal and the VCO signal, an output signal of the frequency converter 12 includes a phase error that increases according to a time.

FIGS. 9A to 9C are timing diagrams when there is the frequency offset between the reception signal and the VCO signal. FIG. 9A is a diagram illustrating data included in the reception signal, FIG. 9B is a diagram illustrating an analog control signal $V_{MIX}$, and FIG. 9C is a diagram illustrating a waveform of a digital control signal $D_{ctl}$. If there is the frequency offset, as illustrated in FIG. 9B, a signal level of the analog control signal $V_{MIX}$ gradually increases and diverges and a signal level of the digital control signal $D_{ctl}$ in a differential relation gradually decreases and diverges. Therefore, the digital control signal $D_{ctl}$ is smaller than a threshold value and 0 and 1 cannot be detected accurately by a data slicer 5.

The frequency offset cancellation unit 31 corrects a frequency setting code signal FCW using a preamble portion provided immediately before a data portion, for each of symbols included in the reception signal. The preamble portion includes a carrier signal that is not modulated and the data portion includes a carrier signal that is modulated.

For example, in the case of a simple sine wave signal of a frequency $\omega_{RF}$ where the preamble portion is not BPSK-modulated, if the frequency offset of the reception signal and the VCO signal is set as $\omega_{os}$, a phase error accumulated for each cycle $T_{REF}$ of a reference signal is represented by the following formula (3).

$$\Delta\phi = \omega_{os} \times T_{REF} \tag{3}$$

Figure 11:
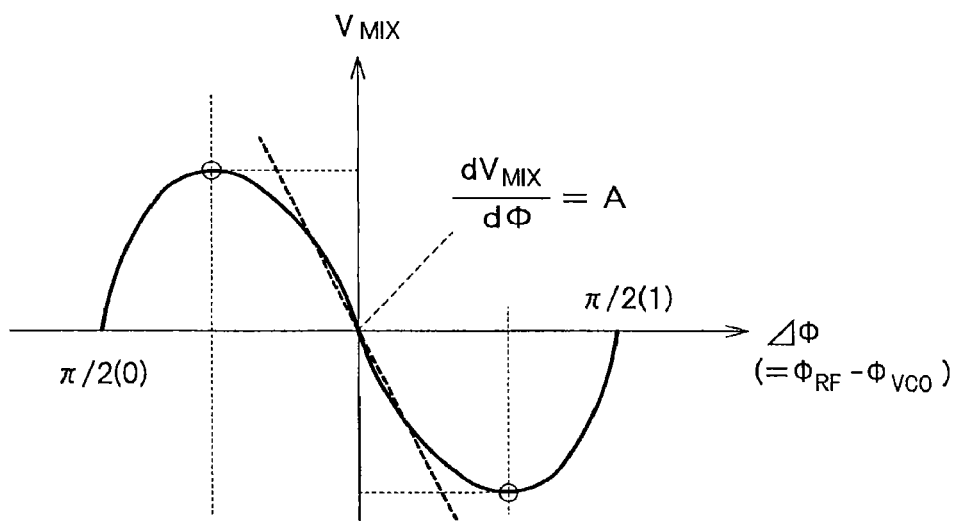
FIG. 11 is a diagram illustrating a phase-voltage characteristic of the analog control signal $V_{MIX}$.

FIG. 10A is a diagram illustrating data of the reception signal in the preamble portion of the reception signal, FIG. 10B is a diagram illustrating the analog control signal $V_{MIX}$ in the preamble portion, and FIG. 10C is a diagram illustrating a waveform of the digital control signal $D_{ctl}$ in the preamble portion. FIG. 11 is a diagram illustrating a phase-voltage characteristic of the analog control signal $V_{MIX}$.

As illustrated in FIG. 10C, if gain of the vicinity of an origin of the phase-voltage characteristic of the frequency converter 12 is set as A, a variation $\Delta V_{MIX}$ of a control voltage of the analog control loop by a phase error of the formula (3) described above is represented by the following formula (4).

$$\Delta V_{MIX} = A \times \Delta\phi = A \times \omega_{os} \times T_{REF} \tag{4}$$

Because the digital control signal $D_{ctl}$ is in a differential relation with the formula (4), an output $D_{out}$ of the differentiator in the frequency offset cancellation circuit is represented by the following formula (5).

$$D_{out} = A \times \omega_{os} \times T_{REF} \tag{5}$$

As seen from the formula (5), a value proportional to the frequency offset can be detected as the output $D_{out}$ of the differentiator. In the frequency offset cancellation unit 31, a negative feedback loop configured using a gain control unit (gain controller) and a digital integrator adjusts a frequency setting code signal FCW. The frequency offset cancellation unit 31 is a primary control system in which the number of origin poles by the digital integrator is one.

As such, in the third embodiment, the frequency offset cancellation unit 31 is provided to cancel the frequency offset of the reception signal and the VCO signal. Therefore, the phase error is not accumulated in the digital control signal $D_{ctl}$ and an error rate can be suppressed at the time of reception and demodulation.

Fourth Embodiment

In a fourth embodiment described below, a processing result by frequency offset cancellation in the third embodiment is reflected at a high speed.

FIG. 12 is a block diagram illustrating a schematic configuration of a receiver 1 in a wireless communication device according to the fourth embodiment. In FIG. 12, components common to the components of FIG. 8 are denoted with the same reference numerals and a difference is mainly described below.

The receiver 1 of FIG. 12 is obtained by newly providing a high-speed settling gain control unit (first high-speed settling gain controller) 41 in the digital control loop unit 3 of FIG. 8 and the other configuration thereof is the same as the configuration of the receiver 1 of FIG. 8.

The high-speed settling gain control unit 41 multiplies an output signal of a frequency offset cancellation unit (frequency offset cancellation circuitry) 31 by γ and performs gain adjustment. An output signal of the high-speed settling gain control unit 41 is added to an output signal of a loop filter 29 by a digital adder 42 and a final digital control signal $D_{ctl}$ is generated.

As such, in a digital control loop unit (digital control loop circuitry) 3 of FIG. 12, the output signal of the frequency offset cancellation unit 31 is used to correct a frequency setting code signal FCW and is used to correct the digital control signal $D_{ctl}$ output from the loop filter 29. The reason is as follows. A transfer function of a signal on a path reaching from an input of the frequency setting code signal FCW in the data control loop to a voltage controlled oscillator 4 has a characteristic of a low-pass filter determined by a loop band of the digital control loop unit 3, as shown by a waveform w1 of FIG. 13. Therefore, a time corresponding to a response time determined by the transfer function may be necessary for cancelling the frequency offset, whenever the frequency offset cancellation unit 31 corrects a value of the frequency setting code signal FCW. That is, the loop band of the frequency offset cancellation unit 31 may be restricted.

Meanwhile, a transfer function of a signal on a path reaching from an output of the loop filter 29 to an input of the voltage controlled oscillator 4 has a characteristic of a high-pass filter, as shown by a waveform w2 of FIG. 13. When the transfer function has the characteristic of the high-pass filter, it means that, if the output signal of the frequency offset cancellation unit 31 is superimposed on the path, an effect of the frequency offset can be reflected quickly.

Therefore, in this embodiment, the gain of the output signal of the frequency offset cancellation unit 31 is adjusted by the high-speed settling gain control unit 41 composed of a digital multiplier, the output signal of the frequency offset cancellation unit 31 is synthesized with the output signal of the loop filter 29, and the effect of the frequency offset appears quickly.

As such, in the fourth embodiment, because the output signal of the frequency offset cancellation unit 31 is synthesized with the output signal of the loop filter 29 having the characteristic of the high-pass filter, the frequency offset can be adjusted quickly.

Fifth Embodiment

A fifth embodiment described below can be used when an FSK-modulated signal is received.

FIG. 14 is a block diagram illustrating a schematic configuration of a receiver 1 in a wireless communication device according to the fifth embodiment. In FIG. 14, components common to the components of FIG. 4 are denoted with the same reference numerals and a difference is mainly described below.

The receiver 1 of FIG. 14 includes a phase shift unit (phase shift circuitry) 51 and an adder (adder circuitry) 52 provided in a digital control loop unit (digital control loop circuitry) 3, in addition to the configuration of FIG. 4. The phase shift unit 51 prevents accumulation of a phase error. An output signal of the phase shift unit 51 is added to an output signal of an integrator 28 by the adder 52 and is input to a loop gain control unit (loop gain controller) 27.

In the case in which the PSK-modulated signal is received, if a frequency offset of the reception signal and a VCO signal is corrected, the phase error is not accumulated and an analog control signal $V_{MIX}$ and a digital control signal $D_{ctl}$ do not diverge. However, in the case of FSK modulation, if 1 (reception signal frequency is $\omega_{RF}+\Delta\omega_m$) appears continuously as data or 0 (reception signal frequency is $\omega_{RF}-\Delta\omega_m$) appears continuously as the data, the phase error may be accumulated and the analog control signal $V_{MIX}$ and the digital control signal $D_{ctl}$ may diverge. The phase shift unit 51 prevents the accumulation and the divergence.

FIGS. 15A and 15B are waveform diagrams illustrating an operation principle of the phase shift unit 51. FIG. 15A illustrates the case in which the phase shift unit 51 is not provided and FIG. 15B illustrates the case in which the phase shift unit 51 is provided. For example, when data received in the reception signal is 111, a phase of a waveform w2 of the digital control signal $D_{ctl}$ becomes opposite to a phase of a waveform w1 of the analog control signal $V_{MIX}$. Therefore, a value of the digital control signal $D_{ctl}$ becomes 100 and the value is different from a value of the data of the reception signal, from a second symbol of the data.

Therefore, the phase shift unit 51 shifts the phase of the digital control signal $D_{ctl}$ in accordance with output data of a data slicer 5, for each symbol. For example, if output data of the data slicer 5 is 1, the phase of the digital control signal $D_{ctl}$ is shifted by $+\pi/2$ and if the output data of the data slicer 5 is 0, the phase of the digital control signal $D_{ctl}$ is shifted by $-\pi/2$. Thereby, when the data 111 is included in the reception signal, as illustrated in FIG. 15B, the phase shift unit 51 shifts the phase of the digital control signal $D_{ctl}$ by $+\pi/2$, for each symbol. As a result, the data 111 is output from the data slicer 5.

As such, in the fifth embodiment, when the FSK-modulated signal is received, the phase of the digital control signal $D_{ctl}$ is shifted by the phase shift unit 51, in accordance with the output data of the data slicer 5. Therefore, even when data having the same value appears continuously in the reception signal, the phase error is not accumulated and the signal can be demodulated accurately.

The digital control loop unit 3 of FIG. 14 has the loop filter 29 and the channel selection filter 30. However, at least one of the loop filter 29 and the channel selection filter 30 may be omitted.

Sixth Embodiment

In a sixth embodiment described below, a function of cancelling a phase offset is provided.

FIG. 16 is a block diagram illustrating a schematic configuration of a receiver 1 in a wireless communication device according to the sixth embodiment. In FIG. 16, components common to the components of FIG. 14 are denoted with the same reference numerals and a difference is mainly described below.

The receiver 1 of FIG. 16 includes a phase offset cancellation unit (phase offset cancellation circuitry) 53 and an adder 54 provided in a digital control loop unit (digital control loop circuitry) 3, in addition to the configuration of FIG. 14. The phase offset cancellation unit 53 detects a phase difference at a phase having superior linearity, when the phase difference is detected by a frequency converter 12. An output signal of the phase offset cancellation unit 53 is added to an output signal of the integrator 28 by the adder 54 and is input to the adder 52.

That is, in the first to fifth embodiments described above, data is demodulated in a state in which a phase difference of the reception signal and the VCO signal is zero and linearity of a phase-voltage characteristic of the frequency converter 12 is best. However, as illustrated in FIG. 17, there is the case in which the demodulation needs to be performed in a state in which a phase difference having bad linearity is set as an initial value. Therefore, the phase offset cancellation unit 53 performs process for returning the initial value to an optimal value.

The phase offset cancellation unit 53 performs phase offset cancellation processing using a preamble portion provided for each of symbols of the reception signal. It is assumed that $\omega_{RF}$ of the reception signal and $\omega_{VCO}$ of the VCO signal are matched with each other. In this state, the phase offset cancellation unit 53 stores a digital control signal $D_{ctl}$ and an inclination while sweeping a phase of the VCO signal from 0 to $2\pi$, with resolution of about $\pi/8$, for example. As a result, as illustrated in FIG. 17, the digital control signal $D_{ctl}$ changes while taking a maximum and a minimum value alternately and an optimal phase state is obtained when the inclination becomes minus in an intermediate value of the maximum value and the minimum value.

As such, in the sixth embodiment, because the phase offset cancellation unit 53 is provided in the digital control loop unit 3, data demodulation can be performed in a phase state in which the linearity of digital control signal $D_{ctl}$ is good and demodulation processing is performed without being affected by the phase offset of the reception signal and the VCO signal.

The digital control loop unit 3 of FIG. 16 has the phase shift unit 51 and the phase offset cancellation unit 53. However, the phase shift unit 51 may be omitted. In addition, at least one of the loop filter 29 and the channel selection filter 30 may be omitted.

Seventh Embodiment

A seventh embodiment described below includes all of the characteristic configurations of the first to sixth embodiments described above.

FIG. 18 is a block diagram illustrating a schematic configuration of a receiver 1 in a wireless communication device according to the seventh embodiment. The receiver 1 of FIG. 18 includes a high-speed settling gain control unit (second high-speed settling gain controller) 56 for a phase shift unit (phase shift circuitry) 51 and a high-speed settling gain control unit (third high-speed settling gain controller) 59 for a phase offset cancellation unit 53, in addition to a high-speed settling gain control unit (first high-speed settling gain controller) 41 for a frequency offset cancellation unit (frequency offset cancellation circuitry) 31, similar to FIG. 12.

A digital differentiator 57 is provided at a rear step of the high-speed settling gain control unit 56 for the phase shift unit 51. Likewise, a digital differentiator 60 is provided at a rear step of the high-speed settling gain control unit 59 for the phase offset cancellation unit 53.

An output signal of the high-speed settling gain control unit 41 for the frequency offset cancellation unit 31 and an output signal of the digital differentiator 57 are synthesized by a digital adder 58. An output signal of the digital adder 58 and an output signal of the digital differentiator 60 are synthesized by a digital adder 61. An output signal of the digital adder 61 and an output signal of a loop filter 29 are synthesized by a digital adder 62 and a final digital control signal $D_{ctl}$ is generated. The digital control signal $D_{ctl}$ is a signal used in consideration of cancellation of the frequency offset, accumulation prevention of a phase error, and cancellation of the phase offset and the digital control signal is synthesized by a digital adder 24 on a path having a characteristic of a high-pass filter. Therefore, the cancellation of the frequency offset, the accumulation prevention of a phase error, and the cancellation of the phase offset can be performed at a high speed.

Eighth Embodiment

In the first to seventh embodiments described above, the configuration and operation of the receiver 1 are described. However, in an eighth embodiment described below, in addition to the configuration of the receiver 1 according to any one of the first to seventh embodiments, a hardware configuration example of a wireless communication device including a transmitter will be described. Because a receiver 1 in the wireless communication device according to the eighth embodiment has the configuration according to any one of the first to seventh embodiments, detailed description thereof is omitted.

Figure 19:
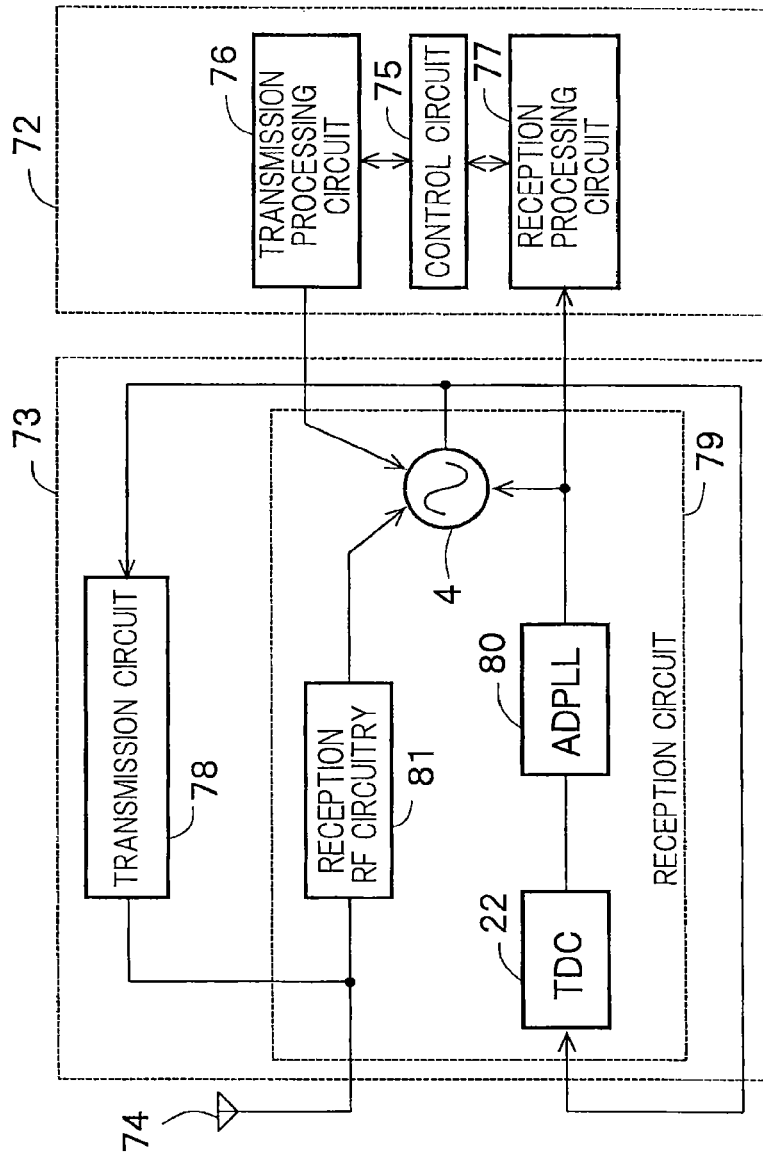
FIG. 19 is a block diagram illustrating a schematic configuration of a wireless communication device 71 according to an eighth embodiment.

FIG. 19 is a block diagram illustrating a schematic configuration of a wireless communication device 71 according to the eighth embodiment. The wireless communication device 71 of FIG. 19 includes a baseband unit (baseband circuitry) 72, an RF unit (RF circuitry) 73, and an antenna unit (antenna circuitry) 74.

The baseband unit 72 has a control circuit 75, a transmission processing circuit 76, and a reception processing circuit 77. Each circuit in the baseband unit 72 performs digital signal processing.

The control circuit 75 performs processing of a media access control (MAC) layer, for example. The control circuit 75 may perform processing of a network hierarchy upper than the MAC layer. In addition, the control circuit 75 may perform processing multi-input multi-output (MIMO). For example, the control circuit 75 may perform propagation path estimation processing, transmission weight calculation processing, and stream separation processing.

The transmission processing circuit 76 generates a digital transmission signal. The reception processing circuit 77 performs processing such as analysis of a preamble and a physical header, after executing digital demodulation or decoding.

The RF unit 73 has a transmission circuit 78 and a reception circuit 79. The transmission circuit 78 includes a transmission filter (not illustrated in the drawings) to extract a signal of a transmission band, a mixer (not illustrated in the drawings) to up-convert a signal having passed through the transmission filter into a radio frequency using an oscillation signal of a VCO 4, and a preamplifier. The reception circuit 79 has the same configuration as the configuration of the receiver 1 according to any one of the first to seventh embodiments. That is, the reception circuit 79 has a TDC 22, an ADPLL unit (ADPLL circuitry) 80, a reception RF unit (reception RF circuitry) 81, and a VCO 4. The ADPLL unit 80 has a binary counter 23, a digital adder 24, a digital differentiator 25, a digital subtracter 26, and a loop gain control unit (loop gain controller) 27 of FIG. 1, for example. The reception RF unit 81 has a low noise amplifier 11, a frequency converter 12, and a low-pass filter 13 of FIG. 1, for example. In the RF unit 73 of FIG. 19, the VCO 4 is used commonly in the transmission circuit 78 and the reception circuit 79. However, the VCO may be provided in each of the transmission circuit 78 and the reception circuit 79.

When the radio signal is transmitted and received by the antenna unit 74, a switch to connect any one of the transmission circuit 78 and the reception circuit 79 to the antenna unit 74 may be provided in the RF unit 73. If the switch is provided, the antenna unit 74 can be connected to the transmission circuit 78 at the time of transmission and the antenna unit 74 can be connected to the reception circuit 79 at the time of reception.

Figure 20:
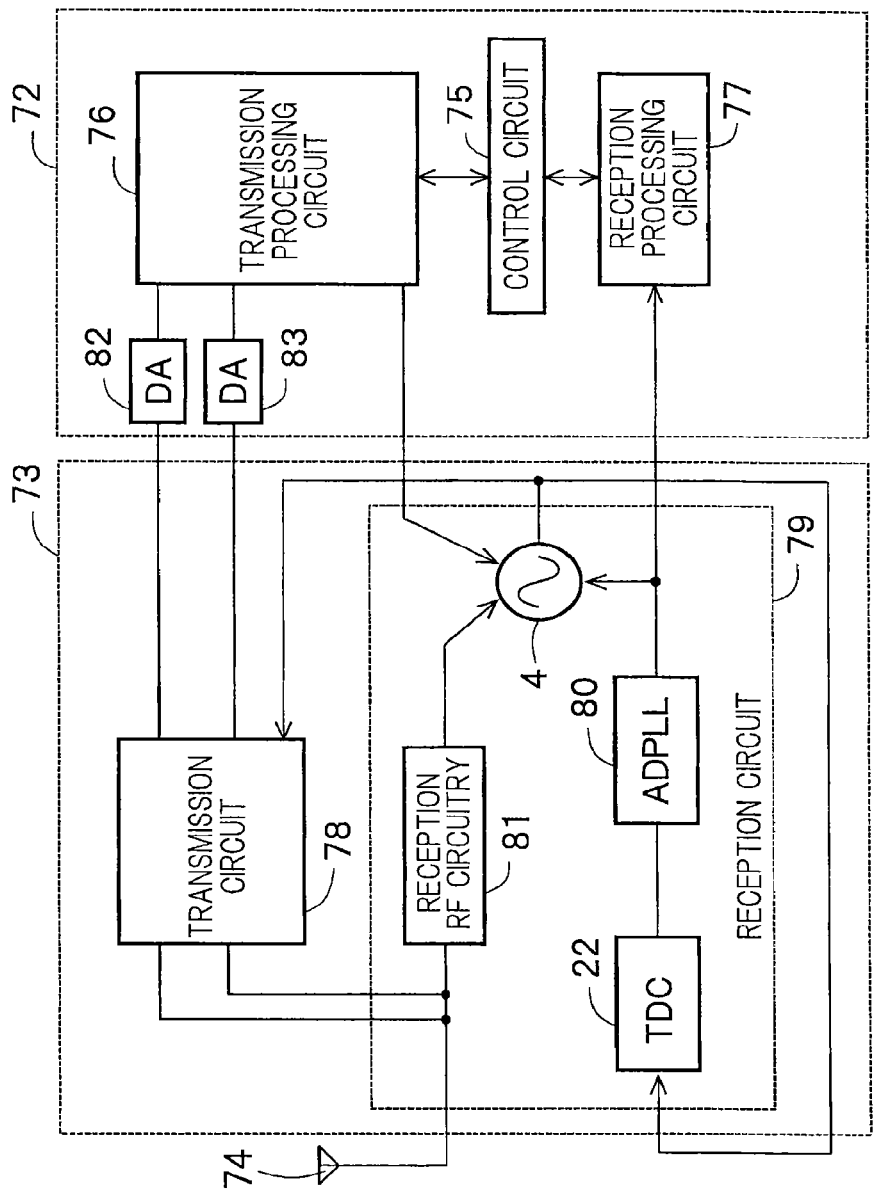
FIG. 20 is a block diagram of a modification of FIG. 19.

The transmission processing circuit 76 of FIG. 19 outputs only a transmission signal of one system. However, a signal may be divided into an I signal and a Q signal and the I signal and the Q signal may be output, according to a communication system. In this case, a block configuration of the wireless communication device 71 is as illustrated in FIG. 20, for example. In the wireless communication device 71 of FIG. 20, a configuration from the transmission processing circuit 76 to the transmission circuit 78 is different from the configuration of FIG. 19.

The transmission processing circuit 76 generates digital baseband signals (hereinafter, referred to as a digital I signal and a digital Q signal) of two systems.

A DA conversion circuit 82 to convert the digital I signal into an analog I signal and a DA conversion circuit 83 to convert the digital Q signal into an analog Q signal are provided between the transmission processing circuit 76 and the transmission circuit 78. The transmission circuit 78 up-converts the analog I signal and the analog Q signal by the mixer not illustrated in the drawings.

The RF unit 73 and the baseband unit 72 illustrated in FIGS. 19 and 20 may be configured using an integrated circuitry of one chip and the RF unit 73 and the baseband unit 72 may be configured using an integrated circuitry of different chips. In addition, parts of the RF unit 73 and the baseband unit 72 may be configured by discrete components and the remaining portions may be configured using a plurality of chips.

In addition, the RF unit 73 and the baseband unit 72 may be configured using a software radio that can be reconfigured in a software manner. In this case, functions of the RF unit 73 and the baseband unit 72 may be realized in a software manner using a digital signal processing processor. In this case, a bus, a processor core, and an external interface unit (external interface circuitry) are provided in the wireless communication device 71 illustrated in FIGS. 19 and 20. The processor core and the external interface unit are connected via the bus and firmware is operated in the processor core. The firmware can be updated by a computer program. The processor core operates the firmware, so that processing operations of the RF unit 73 and the baseband unit 72 illustrated in FIGS. 19 and 20 can be executed by the processor core.

The wireless communication device 71 illustrated in FIGS. 19 and 20 includes only one antenna unit (antenna circuitry) 74. However, the number of antennas is not limited in particular. The antenna unit 74 for transmission and the antenna unit 74 for reception may be provided individually and the antenna unit 74 for the I signal and the antenna unit 74 for the Q signal may be provided individually. When only one antenna unit 74 is provided, the transmission and the reception may be switched by a transmission/reception switch.

The wireless communication device 71 illustrated in FIGS. 19 and 20 can be applied to a stationary wireless communication device 71 such as an access point, a wireless router, and a computer, can be applied to a portable wireless terminal such as a smartphone and a mobile phone, can be applied to a peripheral device, such as a mouse and a keyboard, performing wireless communication with a host device, and can be applied to a wearable terminal communicating biological information wirelessly. A wireless system of wireless communication between the wireless communication devices 71 illustrated in FIGS. 19 and 20 is not limited in particular and various communication systems such as cellular communication after the third generation, wireless LAN, Bluetooth (registered trademark), and proximity wireless communication can be applied.

Figure 21:
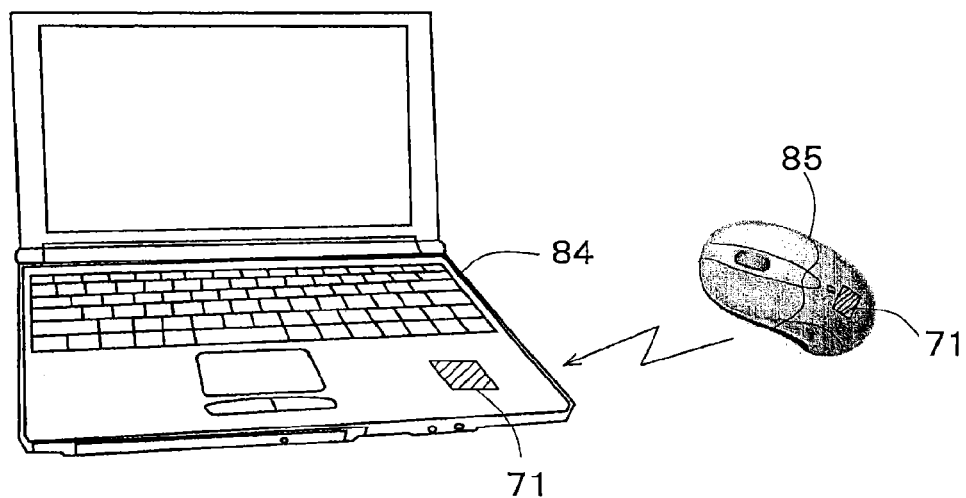
FIG. 21 is a diagram illustrating an example of wireless communication of a PC and a mouse.

FIG. 21 illustrates an example of the case in which wireless communication is performed between a PC 84 as a host device and a mouse 85 as a peripheral device. The wireless communication device 71 illustrated in FIG. 19 or 20 is embedded in both the PC 84 and the mouse 85. The mouse 85 performs wireless communication using power of an embedded battery. However, because a space to embed the battery is limited, the wireless communication needs to be performed using minimum consumption power. Therefore, the wireless communication is preferably performed using a wireless system enabling low consumption power wireless communication such as Bluetooth Low Energy formulated in a standard of Bluetooth (registered trademark) 4.0.

Figure 22:
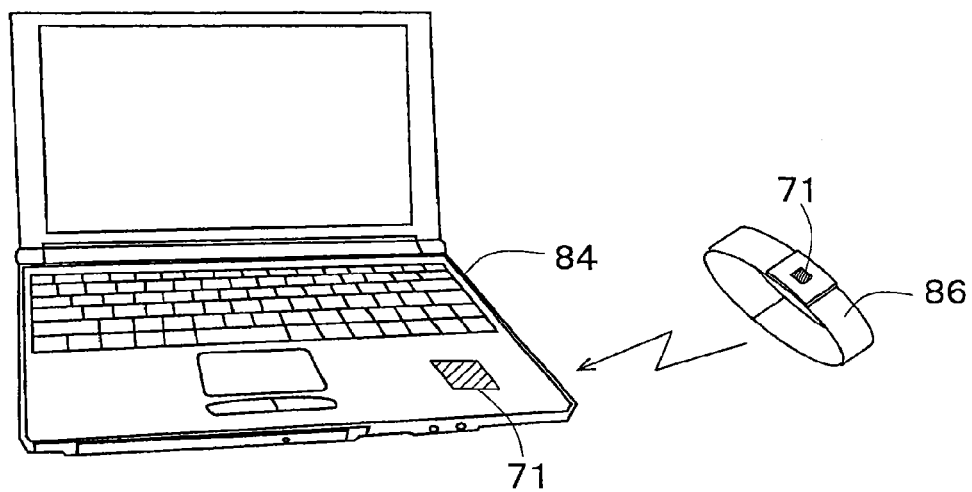
FIG. 22 is a diagram illustrating an example of wireless communication of the PC and a wearable terminal.

FIG. 22 illustrates an example of the case in which the wireless communication is performed between a wearable terminal 86 and a host device (for example, the PC 84). The wearable terminal 86 is mounted on a human body. In addition to a type of being mounted on an arm as illustrated in FIG. 22, various types such as a sealing type of being stuck on the human body, a glass type and an earphone type of being mounted on the human body other than the arm, and a type of being inserted into the human body like a pacemaker are considered. In the case of FIG. 22, the wireless communication device 71 illustrated in FIG. 19 or 20 is embedded in both the wearable terminal 86 and the PC 84. The PC 84 is a computer or a server. Because the wearable terminal 86 is attached to the human body, a space for an embedded battery is limited. Therefore, the wireless system enabling the low consumption power wireless communication such as Bluetooth Low Energy is preferably adopted.

In addition, when the wireless communication is performed between the wireless communication devices 71 illustrated in FIGS. 19 and 20, a type of information transmitted and received by the wireless communication is not limited in particular. However, when information having a large data amount such as moving image data is transmitted and received and when information a small data amount such as operation information of the mouse 85 is transmitted and received, a wireless system is preferably changed and the wireless communication needs to be performed using an optimal wireless system, according to an amount of information transmitted and received.

In addition, when the wireless communication is performed between the wireless communication devices 71 illustrated in FIGS. 19 and 20, an informing unit (informing circuitry) to inform a user of an operation state of the wireless communication may be provided. As a specific example of the informing unit, the informing unit may display the operation state on a display device such as an LED, the informing unit may inform the user of the operation state using vibration of a vibrator, and the informing unit may inform the user of the operation state using audio information by a speaker or a buzzer.

At least a part of the receiver 1 described in the embodiments may be configured by hardware and may be configured by software. When at least the part of the receiver 1 is configured by the software, a program for realizing a function of at least the part of the receiver 1 may be stored in a recording medium such as a flexible disk and a CD-ROM and may be read and performed by a computer. The recording medium is not limited to a removable recording medium such as a magnetic disk and an optical disk and may be a stationary recording medium such as a hard disk device and a memory.

The program for realizing the function of at least the part of the receiver 1 may be distributed through a communication line (including the wireless communication) such as the Internet. In addition, the same program may be encrypted or modulated and may be distributed in a compressed state through a wired circuit or a wireless circuit such as the Internet or the same program may be stored in the recording medium and may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication device comprising:
an analog control loop circuitry that generates an analog control signal to adjust a phase of a voltage controlled oscillation signal, in accordance with a phase of a reception signal;
a digital control loop circuitry that generates a digital control signal having a frequency determined by a frequency of a reference signal and a predetermined frequency setting code signal and having a phase opposite to a phase of the analog control signal;
a voltage controlled oscillator that generates the voltage controlled oscillation signal, on the basis of the analog control signal and the digital control signal; and
a data slicer that generates a digital signal obtained by digital demodulation of the reception signal, on the basis of a comparison result of the digital control signal and a predetermined threshold value,
wherein gain of the digital control loop circuitry is higher than gain of the analog control loop circuitry.

2. The wireless communication device according to claim 1,
wherein the analog control loop circuitry comprises a frequency converter that generates a phase difference signal of the reception signal and the voltage controlled oscillation signal and a low-pass filter that restricts a band of an output signal of the frequency converter and generates the analog control signal, and
the digital control loop circuitry has a phase-digital converter that detects a phase of the voltage controlled oscillation signal in synchronization with the reference signal, a digital differentiator that performs differentiation processing on an output signal of the phase-digital converter and converts the output signal into frequency information, a digital subtracter that detects a difference of an output signal of the digital differentiator and the frequency setting code signal and generates a frequency error signal, and a loop gain controller that generates the digital control signal, on the basis of an output signal of the digital subtracter.

3. The wireless communication device according to claim 2, further comprising:
a first filter that smooths an output signal of the loop gain controller and generates the digital control signal; and
a second filter that supplies a signal obtained by removing an interfering wave component included in an output signal of the first filter to the data slicer,
wherein the data slicer generates the digital signal, on the basis of a comparison result of an output signal of the second filter and the predetermined threshold value.

4. The wireless communication device according to claim 2, further comprising:
a frequency offset cancellation circuitry that corrects the frequency setting code signal to eliminate an error of a frequency of the reception signal and a frequency of the voltage controlled oscillation signal.

5. The wireless communication device according to claim 4,
wherein the reception signal includes a preamble portion including a non-modulated carrier signal and a modulation portion obtained by modulating data in the carrier signal, for each symbol, and
the frequency offset cancellation circuitry corrects the frequency setting code signal on the basis of the preamble portion of the reception signal, for each symbol.

6. The wireless communication device according to claim 4, further comprising:
a first high-speed settling gain controller that adjusts the digital control signal output from the loop gain controller, on the basis of a correction signal that corrects the frequency setting code signal by the frequency offset cancellation circuitry,
wherein the digital control signal corrected by the first high-speed settling gain controller is input to the voltage controlled oscillator.

7. The wireless communication device according to claim 2,
wherein the reception signal is a frequency-shift keying (FSK) signal, and
the wireless communication device further includes a phase shift circuitry that adjusts a phase of an output signal of the digital subtracter, on the basis of the digital signal generated by the data slicer, such that a phase of the digital control signal changes in a monotonic increase direction or a monotonic decrease direction for each symbol.

8. The wireless communication device according to claim 7, further comprising:
a second high-speed settling gain controller that adjusts the digital control signal output from the loop gain controller, on the basis of a phase adjustment signal to adjust the phase of the output signal of the digital subtracter by the phase shift circuitry.

9. The wireless communication device according to claim 2, further comprising:
a phase offset cancellation circuitry that adjusts a phase of the digital control signal, in accordance with timing when the analog control signal becomes equal to an intermediate value of a maximum amplitude value and a minimum amplitude value, when a frequency of the analog control signal and a frequency of the digital control signal are matched with each other.

10. The wireless communication device according to claim 9, further comprising:
a third high-speed setting gain controller that adjusts the digital control signal output from the loop gain controller, on the basis of a phase adjustment signal that adjusts the phase of the digital control signal by the phase offset cancellation circuitry.

11. The wireless communication device according to claim 9,
wherein the reception signal is a frequency-shift keying (FSK) signal that includes a preamble portion including a non-modulated carrier signal and a modulation portion obtained by modulating data in the carrier signal, for each symbol, and
the phase offset cancellation circuitry adjusts the phase of the digital control signal using the carrier signal in the preamble portion.

12. An integrated circuitry comprising the wireless communication device according to claim 1.

13. A wireless communication device comprising:
the integrated circuitry according to claim 12; and
at least one antenna.

14. A wireless communication device comprising:
an RF circuitry; and
a baseband circuitry,
wherein the RF circuitry has a transmission circuitry and a reception circuitry,
the baseband circuitry has a transmission processing circuitry and a reception processing circuitry,
the reception circuitry has an analog control loop circuitry that generates an analog control signal to adjust a phase of a voltage controlled oscillation signal, in accordance with a phase of a reception signal, a digital control loop circuitry that generates a digital control signal having a frequency determined by a frequency of a reference signal and a predetermined frequency setting code signal and having a phase opposite to a phase of the analog control signal, and a voltage controlled oscillator that generates the voltage controlled oscillation signal, on the basis of the analog control signal and the digital control signal,
the reception processing circuitry has a data slicer that generates a digital signal obtained by performing digital demodulation on the reception signal, on the basis of a comparison result of the digital control signal and a predetermined threshold value, and
gain of the digital control loop circuitry is higher than gain of the analog control loop circuitry.

15. A wireless communication method comprising:
generating an analog control signal that adjusts a phase of a voltage controlled oscillation signal, in accordance with a phase of a reception signal, using an analog control loop circuitry;
generating a digital control signal having a frequency determined by a frequency of a reference signal and a predetermined frequency setting code signal and having a phase opposite to a phase of the analog control signal, using a digital control loop circuitry;
generating the voltage controlled oscillation signal, on the basis of the analog control signal and the digital control signal; and
generating a digital signal obtained by digital demodulation of the reception signal, on the basis of a comparison result of the digital control signal and a predetermined threshold value,
wherein gain of the digital control loop circuitry is higher than gain of the analog control loop circuitry.

* * * * *